INVENTOR.
ERNEST J. MADARAS
BY Arthur H Sturges
Attorney

United States Patent Office 2,727,086
Patented Dec. 13, 1955

2,727,086

SOLDERLESS ELECTRICAL WIRING CONNECTOR

Ernest J. Madaras, Minden, Iowa

Application November 1, 1952, Serial No. 318,179

3 Claims. (Cl. 174—51)

This invention relates to connections in electric wiring particularly in connection with outlet and junction boxes in which it is difficult to connect wires entering and leaving the boxes, and in particular this invention includes a plug of insulating material having a plurality of spaced tubes extended therethrough with wires extended into opposite ends of the tubes and secured therein with set screws, and with means for securing the opposite ends of the plug to a conduit and junction box, respectively.

The purpose of this invention is to provide means for making positive connections between wires of a junction box without using solder or other permanent connecting means.

In wiring a building it is always necessary to use numerous junction and outlet boxes in which wires entering one side of a box are connected to wires extended from the opposite side or to wires extended from different sides and for years such connections have been made by twisting the ends of wires and wrapping the twisted ends with tape. In later years, and particularly since the introduction of the electric soldering iron the wires have in many cases been connected with solder, and with the solder connection it is difficult to change a connection.

With this thought in mind this invention contemplates means for making a positive connection between the ends of wires and their protective shielding rigid or flexible conduit or so called armored cable grounded to junction boxes without the use of solder and without twisting the ends of wires together.

The object of this invention is, therefore, to provide means for making positive connections between the ends of a plurality of wires extended through a conduit and the ends of wires extended into a junction box whereby the connections may readily be separated.

Another object of the invention is to provide means for making connections between the ends of wires of one set and the ends of wires of another set without the use of solder.

Another important object of the invention is to provide means for making positive connections between wires of different groups wherein each connection is insulated from the other connections.

A further object of the invention is to provide means for connecting wires of a junction box to wires of a conduit without solder and wherein the connections may be changed as desired.

A still further object of the invention is to provide means for connecting wires of a junction or outlet box to wires of a conduit with positive connections and wherein the connections are adapted to be made by the average layman.

And a still further object of this invention is to provide a connecting element whereby the ends of a plurality of wires of one set are positively connected to the ends of wires of another set in which the connecting element is of a simple and economical construction.

With these and other objects and advantages in view the invention embodies a plug of insulating material with a male nipple extended from one end and a female thread in the opposite end, and having a plurality of spaced tubes extended longitudinally therethrough with set screws threaded in the plug and extended into the tubes for securing the ends of wires in the tubes.

Other features and advantages of the invention will appear from the following description taken in connection with the drawing, wherein.

Figure 1:
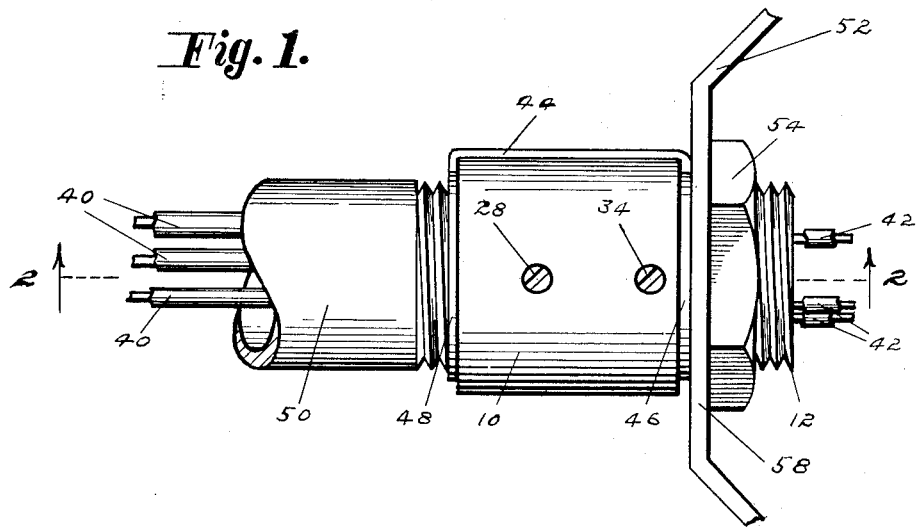
Figure 1 is a plan view of the improved connecting element or plug showing the connector secured in one side of a junction box and with the extended end connected to a conduit, parts of the conduit and junction box being broken away.

Referring now to the drawing wherein like reference characters denote corresponding parts the improved junction box connecting plug of this invention includes a body 10 having suitable complemental conduit connectors such as a threaded male nipple extended from one end, as indicated by the numeral 12, a female threaded socket 14 extended into the opposite end, longitudinally disposed bores 16, 18 and 20 extended through the plug, and suitable electrical conductor bridging elements such as the tubes 22, 24 and 26 positioned in the bores.

Figure 2:
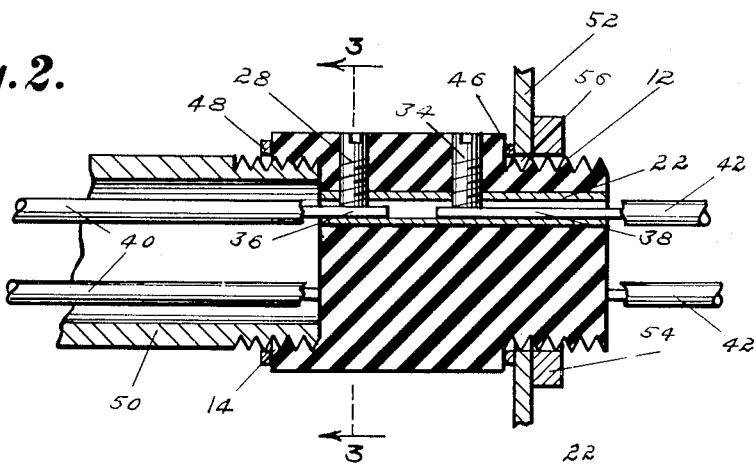
Figure 2 is a longitudinal section through the connector or plug, the section being taken through one of the wire connecting tubes, and parts of a junction box and conduit to which the plug is connected being broken away.
Figure 3:
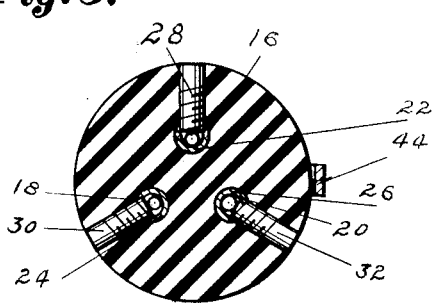
Figure 3 is a cross section through the plug taken on line 3—3 of Figure 2.
Figure 4:
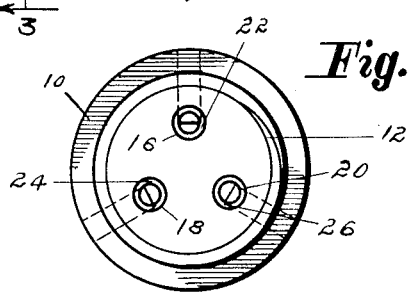
Figure 4 is an end elevational view of the plug looking toward the end that is adapted to be connected to a junction box.

The tubes 22, 24 and 26 are provided in this instance with set screws 28, 30 and 32 at one end of the plug, the screws being threaded through the material of the plug and extended into the tubes, and similar set screws, as indicated by the numeral 34 are provided at the opposite end of the plug. The set screws, as illustrated in Figure 2, engage ends, as indicated by the numerals 36 and 38, of wires such as the wires 40 and 42, respectively, whereby the wires are positively secured in the tubes. By this means the ends of the wires are definitely connected through the tubes without using solder or other permanent connecting means.

The plug is provided with a ground bar 44 having rings 46 and 48 on the ends whereby a suitable electric wire confining member such as the conduit 50 is grounded to a junction box 52. In the design shown the ring 46 is positioned around the male nipple 12 and the ring 48 is positioned to extend around the conduit 50.

The threaded male nipple 12 is provided with a nut 54 with which the plug is clamped in an opening 56 in a wall 58 of the junction or outlet box 52.

With the parts arranged in this manner the ends of wires from a junction box and the ends of wires extended through a conduit are secured in the tubes of the plug with the set screws and with one end of the plug threaded on the end of the conduit the male nipple at the opposite end is clamped in an opening in a wall of a junction or outlet box by the nut 54 and, consequently, positive connections are made between the wires without solder.

The body of the plug may be formed of a suitable electrical non-conducting material, such as plastic, hard rubber, and the like.

From the foregoing description it is thought to be obvious that a solderless electrical wiring connecting plug constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

What is claimed is:

1. An electrical connector for junction boxes and the like comprising a body having complemental electrical wire confining connectors on opposite ends, said body connectors including threaded male and female ends in said body for connection of a junction box and electric wire armored conduit thereto, said body being of non-conducting material and having spaced longitudinally disposed bores extended therethrough, electrical conductor bridging tubes positioned in said bores, wire clamping screws spaced from the ends of the tubes for threaded connection thereto through said body to engage electrical conductor wires therein, and a ground connection extended longitudinally of said body between said complemental electrical wire confining cable connectors, whereby different circuits are electrically joined within the junction box connected to said body.

2. An electrical connecting plug for junction boxes and the like comprising a body having a threaded nipple extended from one end and an internally threaded socket extended into the opposite end for connection of a junction box and electric wire armored conduit thereto, a nut threaded on said nipple, said body having spaced longitudinally disposed bores extended therethrough, metal electrical conductor bridging tubes extended through said bores, and clamping screws spaced from the ends of the tubes for threaded connection thereto through said body to engage electrical conductor wires therein, whereby different circuits are electrically joined within the junction box connected to said body.

3. In an electrical connecting device for junction boxes and the like, the combination which comprises a junction box wall having an opening therein and a plug having a body of insulating material, complemental conduit connectors between said junction box wall and said plug body into which electrical wires from said armored conduit are connected, said plug having spaced longitudinally disposed electrical conducting wire receiving bores therein, electrical connecting bridging elements in said plug body between said bores, screws threaded in the plug body and spaced from the ends of the bores in said plug body for electrical connection with said bridging elements to clamp wires thereto extending from said conduit into the plug body bores, and a grounding bridge associated with said plug body between said complemental connectors thereon to ground the conduit, whereby different circuits are electrically joined within the junction box connected to said body.

References Cited in the file of this patent

UNITED STATES PATENTS

| | | |
|---|---|---|
| 1,103,748 | Finkelstein | July 14, 1914 |
| 1,314,346 | Meschenmoser | Aug. 26, 1919 |
| 1,656,912 | Foster | Jan. 24, 1928 |
| 2,513,147 | Chorpening | June 27, 1950 |
| 2,653,990 | Brant | Sept. 29, 1953 |

FOREIGN PATENTS

| | | |
|---|---|---|
| 482,805 | Germany | Sept. 20, 1929 |